(12) United States Patent
Hofschneider

(10) Patent No.: US 7,101,132 B2
(45) Date of Patent: *Sep. 5, 2006

(54) BOLT FASTENER

(75) Inventor: Manfred Hofschneider, Wuppertal (DE)

(73) Assignee: Altenloh, Brinck & Co. GmbH & Co., Ennepetal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/459,284

(22) Filed: Jun. 11, 2003

(65) Prior Publication Data

US 2004/0047712 A1  Mar. 11, 2004

(30) Foreign Application Priority Data

Jun. 19, 2002 (DE) .................. 202 09 505 U

(51) Int. Cl.
*F16B 35/04* (2006.01)
*F16B 33/00* (2006.01)

(52) U.S. Cl. .................. 411/368; 411/398; 411/166

(58) Field of Classification Search ................ 411/533, 411/531, 910, 368, 372.2, 348, 534, 166, 411/169, 354, 372.1, 160, 163; 403/383; 280/86.753
See application file for complete search history.

(56) References Cited

U.S. PATENT DOCUMENTS

| | | | | |
|---|---|---|---|---|
| 2,031,470 A | * | 2/1936 | Eck et al. ..................... 30/90.3 |
| 2,080,272 A | * | 5/1937 | Hollman ..................... 251/208 |
| 3,880,444 A | * | 4/1975 | Bridges .................. 280/86.753 |
| 4,424,984 A | * | 1/1984 | Shiratori et al. ........ 280/86.753 |
| 4,717,299 A | | 1/1988 | Underwood |
| 4,736,964 A | * | 4/1988 | Specktor .................. 280/86.75 |
| 5,052,771 A | * | 10/1991 | Williams et al. ................ 385/8 |
| 5,405,227 A | | 4/1995 | His et al. |
| 5,580,201 A | * | 12/1996 | Brilmyer ..................... 411/354 |
| 5,628,599 A | * | 5/1997 | Eakin .......................... 411/163 |
| 6,669,421 B1 | * | 12/2003 | Hofschneider .............. 411/354 |

FOREIGN PATENT DOCUMENTS

| | | |
|---|---|---|
| DE | 3027191 A1 | 2/1982 |
| DE | 20012108 U1 | 1/2002 |

* cited by examiner

*Primary Examiner*—Flemming Saether
(74) *Attorney, Agent, or Firm*—Brinks Hofer Gilson & Lione

(57) ABSTRACT

The present invention relates to a connecting arrangement, comprising a bolt element having a shank (4) and comprising at least one washer which can be pushed onto the shank (4), the shank (4) and the washer having such a code that the washer can be pushed onto the shank (4) only in a predetermined position, in particular in such a way that a peripheral punching burr which is present points away from the head of the bolt element. In order to reduce the technological manufacturing outlay of such a connection while functionality remains at least at the same high level, it is proposed that the code consist of at least one convexly designed cross section (Q), which extends over at least a section of the length of the shank (4) and is asymmetrical with regard to all the radial axes (C-C, D-D) running through a central cross-section axis (X1) of the shank (4), and of a push-on opening, interlocking with this cross section (Q), of the second washer. The invention also comprises the elements of the connecting arrangement as individual parts.

8 Claims, 2 Drawing Sheets

BOLT FASTENER

FIELD OF THE INVENTION

The present invention relates to a bolt/washer arrangement, comprising a bolt element having a shank and comprising at least one washer which can be pushed onto the shank, the shank and the washer have a code such that the washer can be pushed on only in a predetermined position.

BACKGROUND OF THE INVENTION

A connecting arrangement is provided. The connecting arrangement, includes a bolt element having a head and a shank adjoining the head. The head being arranged concentric to a bolt longitudinal axis and including an application point configured to a tool. A first eccentric washer is arranged eccentrically to the bolt longitudinal axis. At least one second eccentric washer has a peripheral punching burr on one side and an eccentrically arranged push-on opening. The at least one second eccentric washer can be pushed onto the shank. The shank and the second eccentric washer have a code such that the second eccentric washer can be pushed onto the shank only in such a way that the peripheral punching burr points away from the head.

Furthermore, the invention also comprises the elements of the respective arrangement as individual parts.

Similar connecting arrangements serve for the connection and relative orientation of for example, two components relative to one another. They usually have a threaded section on the shank, onto which a nut can be screwed. The two eccentric washers typically fit into recesses of the two components and the connection is secured via the screw-on nut. Turning of the head then leads via the eccentric washers to a change in position of the components.

The eccentric washer is usually a punched element. During the punching operation, an edge is produced which has a rounded-off shape on one side and a punching burr, projecting in the punching direction, on its other side. This punching burr, when seated in the recess, may lead to damage to the component. In order to prevent such damage during assembly, it was therefore conventional practice to deburr the eccentric washer before assembly, a factor which entails effort and corresponding costs. German Utility Model DE 200 12 108 U1 discloses a connecting arrangement of the type mentioned at the beginning in which the deburring can be omitted but which nonetheless permits simple and quick assembly, the punching burr which is present not getting in the way, since the shank and the second eccentric washer have a code, as a result of which the second eccentric washer can be pushed onto the shank only in such a way that its peripheral punching burr points away from the head. In this case, the code also means that a requisite positional orientation of the two eccentric washers relative to one another during assembly can be realized in a very short time. Described in this case as an advantageous code is the arrangement of two guide grooves having a longitudinal axis running in the direction of the bolt longitudinal axis and different cross sections, the guide grooves interacting with lugs which extend into the interior of the eccentrically arranged push-on opening of the second eccentric washer. In further embodiments, the code is effected in each case via only one guide groove which is asymmetrical in cross section and in which a correspondingly designed lug can be guided. The known connecting arrangement has proved successful in practice, although high functionality of the arrangement requires very close tolerances to be maintained for the guide grooves and lugs during production, a factor which, for the purposes of more economical production, conflicts with the requirement to reduce the manufacturing outlay.

SUMMARY OF THE INVENTION

The object of the present invention is to provide an arrangement of the generic type with which a reduction in the technological manufacturing outlay can be achieved while functionality remains at least at the same high level.

This object is achieved according to the invention in that the code consists of at least one convexly designed cross section, which extends over at least a section of the length of the shank and is asymmetrical with regard to all the radial axes running through a central cross-section longitudinal axis, and of a push-on opening, interlocking with this cross section, of the washer. In the case of the connecting arrangement having an eccentric washer, this washer may in particular be the washer designed according to the invention.

The individual elements of the arrangement in particular the bolt element and the (second eccentric) washer, can be produced with relatively little technological outlay, i.e. they are relatively simple to produce, since the code of the shank can be produced, for example, by reducing certain peripheral regions during a metal forming process. If the shank has a threaded section at one end, onto which threaded section a nut can be screwed, the code in this case may be advantageously located outside the threaded region, i.e. in particular in a center section of the shank, this center section being arranged between the threaded section and the head. This produces additional advantages—during manufacture on the one hand and during use on the other hand, since the entire shank cross section designed according to the invention contributes to the transmission of torque.

The (second eccentric) washer may be produced as a simple punched part, in which case it is advantageously unnecessary to provide any lugs or similar projections in the push-on opening.

Various advantageous embodiments are possible for the code according to the invention. Thus the asymmetrical, convexly designed cross section of the shank and the push-on opening interlocking with this cross section may have in basic form the shape of an irregular convex polygon. The sides of the convex irregular polygon, in order to avoid the formation of sharp edges, may in turn have convex rounded portions, in particular in the shape of an arc of a circle.

The cross section of the shank and the push-on opening may comprise at least two, preferably three to four, straight sides designed and/or arranged asymmetrically with regard to all the radial axes running through the central cross-section longitudinal axis, these straight sides then adjoining one another and/or arc segments.

The arrangement according to the invention is characterized by high functionality. Thus, by means of the code according to the invention, as is also the case in the known arrangement mentioned at the beginning, the correct position of the second eccentric washer can be set not only with regard to the burr which is present but also relative to the first eccentric washer arranged at the head. For example, it may be necessary to arrange both eccentric washers congruently with regard to the bolt longitudinal axis.

Further advantageous embodiments are contained in the subclaims and in the description below. The invention will be explained in more detail with reference to the exemplary embodiment shown in the attached drawing, in which:

DETAILED DESCRIPTION OF THE PREFERRED EMBODIMENT

In the various figures of the drawings, the same parts are always provided with the same designations, so that as a rule they are only described once below.

Figure 1:
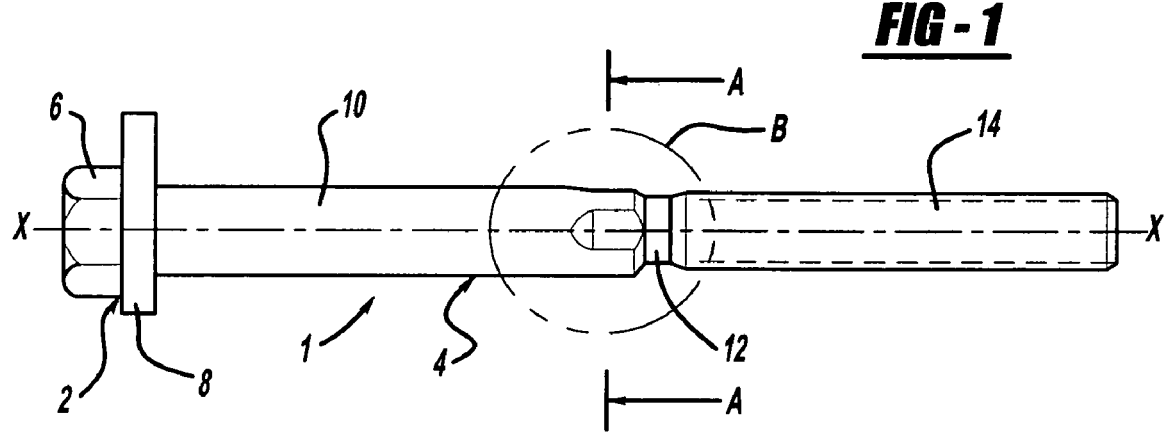
FIG. 1 shows a side view of a bolt element according to the invention of an arrangement according to the invention.

As can be seen from FIG. 1, a bolt/washer arrangement according to the invention, in particular a connecting arrangement, comprises a bolt element 1 according to the invention, in particular a screw, which has a head 2 and an essentially cylindrical shank 4 having a bolt longitudinal axis X-X. The head 2 consists of an application point 6 for a tool and a first eccentric washer 8 arranged eccentrically to the longitudinal axis X-X. In this case, the orientation of the first eccentric washer 8 in relation to the application point 6 is freely selectable. In the exemplary embodiment shown, the shank 4 is subdivided into three sections 10, 12, 14. It begins adjacent to the first eccentric washer 8 with a guide section 10, adjoining which in the center region of the shank 4 is a transition section, which has a smaller outside diameter than the guide section 10. Adjoining the transition section 12 is a threaded section 14, onto which a nut can be screwed.

Figure 4:
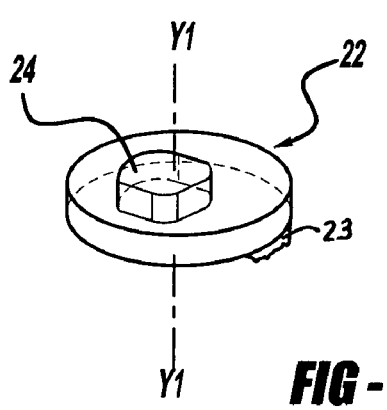
FIG. 4 shows a perspective view of a washer according to the invention, designed as an eccentric washer, of the arrangement according to the invention.

Assigned to the bolt element 1 according to the invention is a washer 22 according to the invention which is designed as a second eccentric washer 22, is shown as a detail in FIG. 4 and has an eccentrically arranged push-on opening 24. The push-on opening 24 is dimensioned in such a way that it can be pushed onto the shank 2 of the screw 1. On one side, the eccentric washer 22 has a punching burr 23 produced during manufacture. The shank 4 and the second eccentric washer 22 have such a code that the second eccentric washer 22 can be pushed onto the shank 4 only in such a way that the peripheral punching burr 23 points away from the head 2.

The code consists of a convexly designed cross section Q (FIG. 2), which extends over at least a section K (FIG. 3) of the length of the shank 4 and which is asymmetrical with regard to all the radial axes (for example the transverse axes C-C, D-D shown in FIG. 2 or the axes M-O, N-P shown in FIGS. 5 and 6) running through a central cross-section longitudinal axis X1 (which may coincide with the bolt longitudinal axis X-X but does not have to), and of the push-on opening 24, interlocking with this cross section Q, of the second eccentric washer 22 (FIG. 4).

That section K (FIG. 3) of the length of the shank 4 over which the cross section Q, designed according to the inventions extends may be located in a thread-free section of the shank 4—preferably, as shown in FIG. 1, in the guide section 10 adjoining the head 2.

Figure 2:
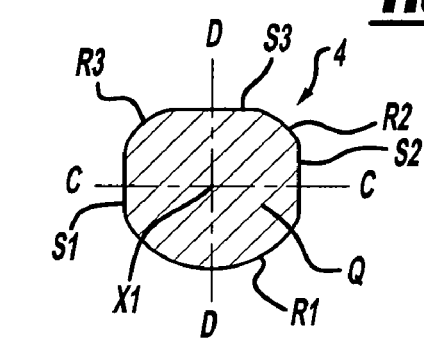
FIG. 2 shows the bolt element according to the invention in an enlarged sectional representation along line A—A in FIG. 1 (without showing the parts lying behind the section plane)
Figure 3:
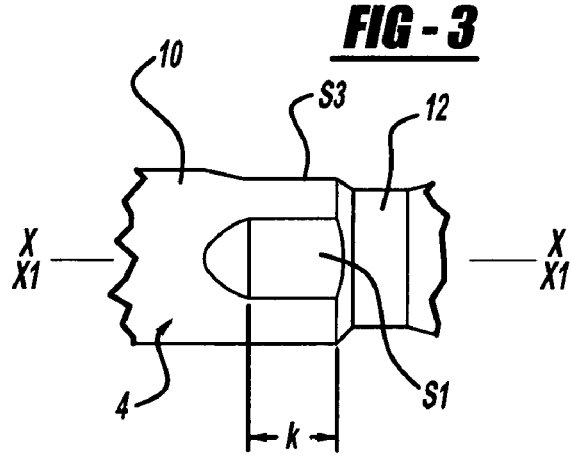
FIG. 3 shows an enlarged detail of the bolt element in the region designated by B in FIG. 1.
Figure 5:
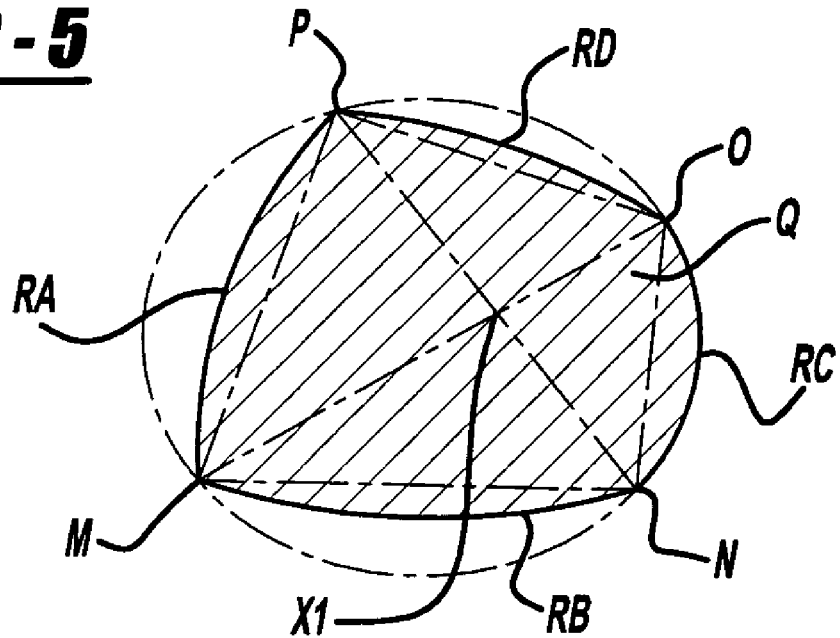
FIGS. 5 and 6 show two further embodiments of a bolt element according to the invention of the arrangement according to the invention in sectional representations corresponding to FIG. 2 but enlarged to an even greater degree.
Figure 6:
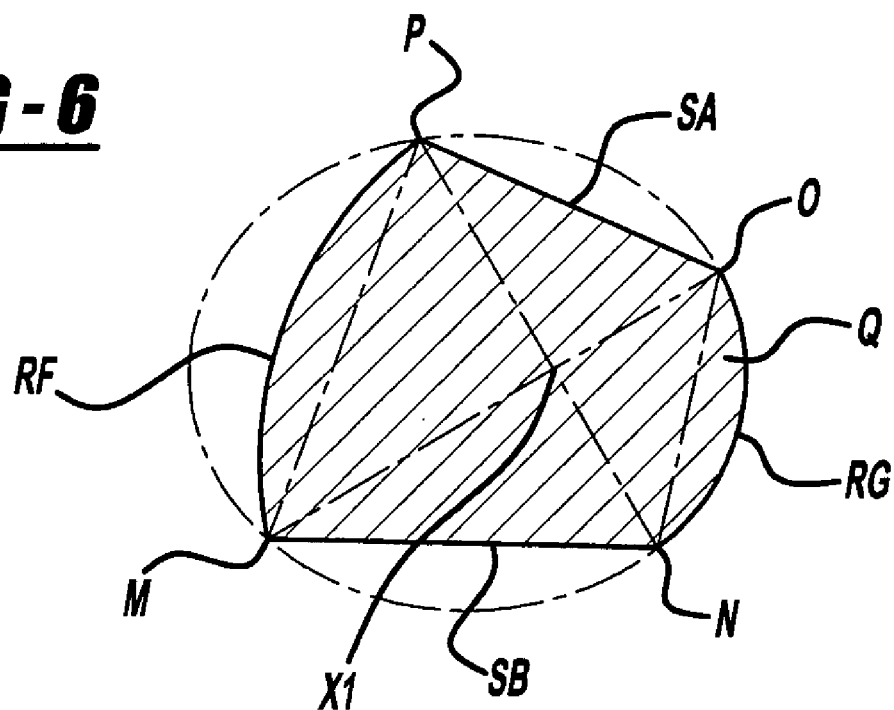

As FIGS. 2, 4 and in particular FIGS. 5 and 6 show, the asymmetrical, convexly designed cross section 0 of the shank 4 and the push-on opening 24 interlocking with cross section Q may preferably have in basic form (core) the shape of an irregular convex polygon. In the embodiments according to FIGS. 5 and 6, this involves in each case quadrilaterals whose corner points are designated by M, N, O, P. In this case a polygon, as is normal in plane geometry, refers to a polygon in which each connecting line between any two corner points runs through its interior. A convex polygon therefore has no corner angle which exceeds 180°.

In addition, the sides of the convex irregular polygon may have convex rounded portions R1, R2, R3 (FIG. 2), RA, RB, RC, RD (FIG. 5), RF, RG (FIG. 6), in particular in the shape of an arc of a circle. In this case, the rounded portions may be formed either by arc regions in particular of an originally essentially circular or elliptical cross section of the shank 4 (e.g. R1, R2, R3 in FIG. 2; RC in FIG. 5; RG in FIG. 6) or by regions deviating from the original cross-sectional shape, in particular flattened regions (such as RA, RB, RD in FIG. 5 and RF in FIG. 6).

In this case, the cross section Q of the shank 4 and the push-on opening 24 may comprise at least two, preferably three to four, straight sides designed and/or arranged asymmetrically with regard to all the radial axes C-C, D-D, M-O, N-P running through the central cross-section longitudinal axis X1. In the first embodiment of the invention, these are the sides designated in FIG. 2 by S1, S2 and S3; in the third embodiment, these are the sides designated in FIG. 6 by SA and SB. It is important here that any axial symmetry with regard to all the possible axes lying in the cross-sectional area is avoided, i.e. the sides S1 and S2 arranged in parallel should have an at least slightly different length and/or the side S3 should be arranged at least slightly asymmetrically to the axis D-D. It would also be possible, for example, for only one of the two sides S1, S2 to run parallel to the axis D-D, while the other respective side is arranged obliquely relative to this axis. By analogy, the same applies to the sides of the push-on opening 24 with regard to all the axes which run radially relative to the central axis Y1-Y1, shown in FIG. 4, of the push-on opening 24.

In detail, the cross section Q in the embodiment according to FIG. 2 is formed by the two straight sides S1 and S2 which run parallel to one another and by the straight side S3 which runs approximately at right angles to these sides S1, S2, these straight sides S1, S2, S3 being connected to one another in each case by the rounded portions R1, R2, R3, which in particular are arc segments. The rounded portion R1 is formed by a relatively long arc segment and connects the sides S1 and S2. The rounded portions R2 and R3 are each formed by relatively short arc segments, the one rounded portion R2 connecting the sides S1 and S2 and the other rounded portion R3 connecting the sides S1 and S3. In this case, the asymmetry according to the invention is achieved relative to the axis C-C by the straight side S3 opposite the rounded portion R1 and relative to the axis D-D in particular by the side S2 being shorter than the side S1 and by that section of the side S3 which in FIG. 2 lies on the right next to the axis D-D being longer than that section of this side S3 which lies on the left next to the axis D-D. It can be shown that, on the basis of this embodiment, there is no symmetry with regard to any axis through the cross section Q.

The cross section according to the embodiment in FIG. 5 is defined by the four arc segments RA, RB, RC and RD are arranged one after the other in the sequence specified. Each arc segment is designed with different convex curvature and different length. The four arc segments connect the corner points M, N, O, P of a core quadrilateral MNOP depicted by broken lines) having unequal sides. There is no symmetry either relative to the axis M-O, or relative to the axis N-P, or relative to any other axis running through the cross section Q.

The cross section according to the embodiment in FIG. 6 is formed by the two arc segments RF and RG and by the straight sides SA and SB, the arc segments RF, RG each having a different (convex) curvature and length. The straight sides SA, SB each have a different length. The arc segments RF, RG and the straight sides SA, SB are arranged alternately one after the other and again connect the corner points M, N, O, P of a core quadrilateral MNOP (depicted by broken lines) having unequal sides. There is no symmetry either relative to the axis M-O, or relative to the axis N-P ,or relative to any other axis running through the cross section Q.

The arrangement according to the invention has high functionality, which manifests itself, inter alia, in the fact that the flat or curved sides of the cross section Q, in addition to their function as code elements, also transmit a torque acting on the bolt element 1 to the second eccentric washer 22. In the assembled state, the (second eccentric) washer 22 can be secured by the above-mentioned nut (not shown here) which can be screwed onto the threaded section 14.

The invention is not restricted to the exemplary embodiments shown but also comprises all embodiments having the same effect within the scope of the invention, for example cross-sectional shapes in which the convex polygon referred to is a triangle or a pentagon and in particular a bolt/washer arrangement according to claim 1 which does not have all the features of the exemplary embodiments.

The eccentric washer 22 with punching burr 23 as already mentioned, represents a washer 22 in general which can be pushed in a predetermined position onto the shank 4 of a bolt element 1, it being possible for the end of the shank 4 to be designed in various different ways. The head 2 described only represents one possible embodiment. Another would be, for example, for a housing or the like to be located on the end of the shank 4.

Furthermore, the invention up to now is also not yet restricted to the feature combinations defined in claims 1, 8 and 11, but may also be defined by any other desired combination of certain features of all the individual features disclosed as a whole. This means that, in principle, virtually any individual feature of the said claims can be omitted or replaced by at least one individual feature disclosed elsewhere in the application.

Designations

1 Bolt element
2 Head of 1
4 Shank of 1
6 Tool application point of 2
8 (First) eccentric washer of 2
10 Guide section of 4
12 Transition section of 4 between 10 and 14
14 Threaded section of 4
22 (Second eccentric) washer
24 Push-on opening of 22
   C-C Transverse axis relative to X1 (first embodiment)
   D-D Transverse axis relative to X1 (first embodiment)
   K Section of the length of 4
   MNOP Polygon, core of Q M, N, O, P Polygon corner points
   M-O Transverse axis relative to X1 (second and third embodiment)
   N-P Transverse axis relative to X1 (second and third embodiment)
   Q Cross section of 4
   R1, R2, R3, Rounded portions (first embodiment)
   RA, RB, RC, RD Rounded portions (second embodiment)
   RF, RG Rounded portions (third embodiment)
   X-X Longitudinal axis of 1
   X1 Central cross-section axis through Q

The invention claimed is:

1. A connecting arrangement, comprising
a bolt element having a shank and a head, the head adjoining with the shank and having an application point, the application point being configured to receive a tool and being arranged concentrically to a bolt longitudinal axis, and the head having a first eccentric washer arranged eccentrically to the bolt longitudinal axis;
at least one second eccentric washer which can be pushed onto the shank, whereby a push-on opening of the at least one second eccentric washer is interlocking with at least one cross section of the shank, and the at least one second eccentric washer having a punching burr on one side;
wherein the shank and the at least one second eccentric washer have a code comprising at least one convexly designed cross-section of the shank, the at least one convexly designed cross-section extends over at least a section of the length of the shank and is asymmetrical With regard to all radial axes running through a central cross-section axis of the push-on opening of the at least one second eccentric washer, the push-on opening interlocking with the at least one convexly designed cross-section of the shank, in such a way that the at least one second eccentric washer can be pushed onto the shank only in a predetermined position, wherein the punching burr of the at least second eccentric washer points away from the head of the bolt element.

2. The connecting arrangement according to claim 1, characterized in that the at least one convexly designed cross section of the shank and the push-on opening interlock, the at least one convexly designed cross section having the shape of an irregular convex polygon.

3. The connecting arrangement according to claim 2, characterized in that the sides of the convex irregular polygon have convex rounded portions in the shape of an arc of a circle.

4. The connecting arrangement according to claim 1, characterized in that the at least one convexly designed cross section of the shank and the push-on opening comprise at least two, straight sides a arranged asymmetrically with regard to all the radial axes running through the central cross-section axis.

5. The connecting arrangement according to claim 1, characterized in that the shank has a threaded section at one end, such that a nut can be screwed onto the threaded section.

6. The connecting arrangement according to claim 1, characterized in that the code is located in a thread-free guide section of the shank.

7. A bolt element comprising:
a shank with a code including at least one cross-section of the shank, which is convexly designed and extends over at least a section of the length of the shank, and the at least one cross-section of the shank is asymmetrical with regard to all radial axes running through a central cross-section axis of the at least a section of the length of the shank;

a head adjoining with the shank and having an application point, the application point being configured to receive a tool and being arranged concentrically to a bolt longitudinal axis, and the head having a first eccentric washer arranged eccentrically to said bolt longitudinal axis;

wherein the code of the shank being such that at least one second eccentric washer, which has a punching burr on one side, can be pushed onto the shank, whereby a push-on opening of said at least second eccentric washer interlocks with said at least one cross section of the shank in such a way that the at least one second eccentric washer can be pushed onto the shank only in a predetermined position, wherein the punching burr of the at least second eccentric washer points away from the head of the bolt element.

8. The bolt according to claim 7, characterized by the shank having the shape of an irregular convex polygon.

* * * * *